April 17, 1962  E. J. TISCHLER ETAL  3,029,832
BRINE TANK VALVE
Original Filed Aug. 27, 1958
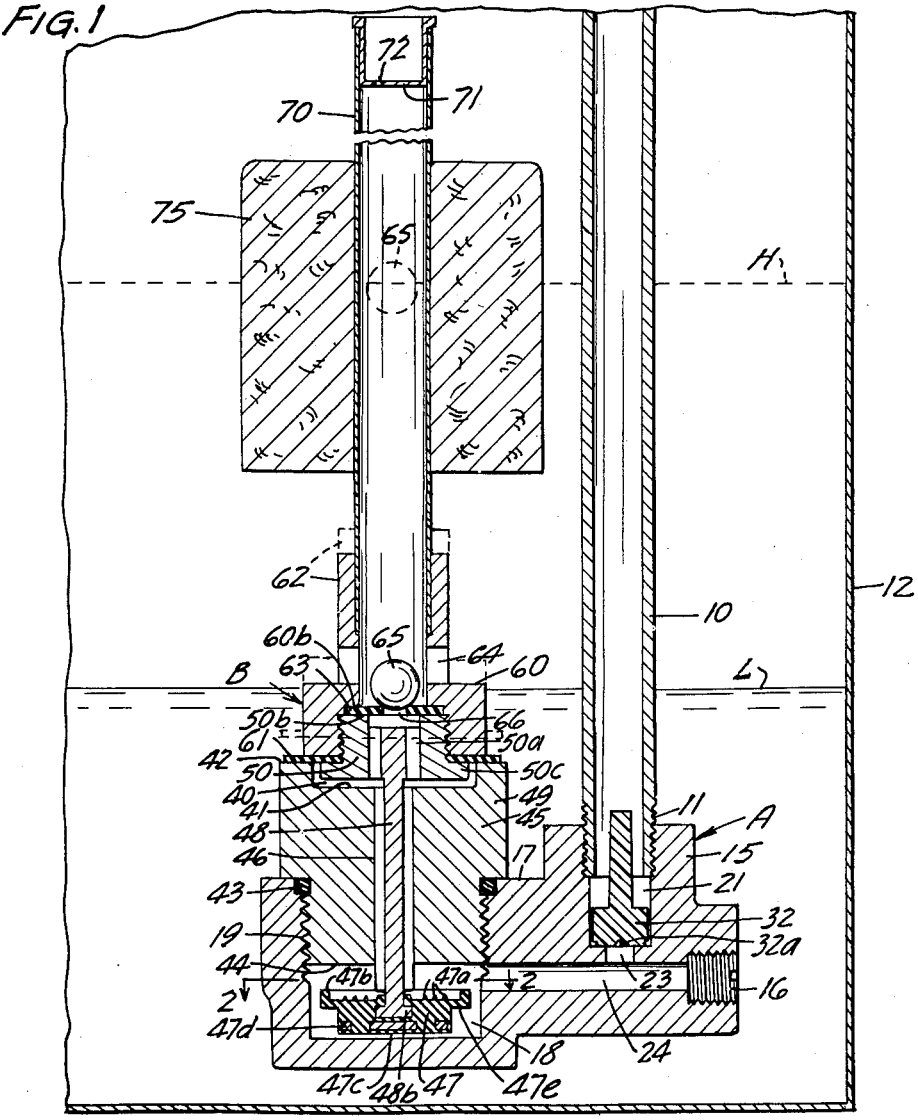
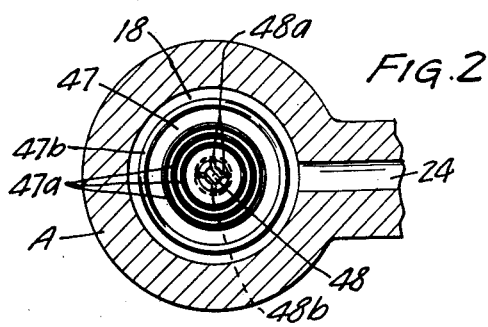
INVENTORS
EDWARD J. TISCHLER
BENJAMIN H. KRYZER
BY John E. Stryker
ATTORNEY 3,029,832
BRINE TANK VALVE
Edward J. Tischler and Benjamin H. Kryzer, St. Paul, Minn., assignors, by mesne assignments, to Union Tank Car Company, Chicago, Ill., a corporation of New Jersey
Original application Aug. 27, 1958, Ser. No. 757,470, now Patent No. 2,985,423, dated May 23, 1961. Divided and this application Sept. 23, 1960, Ser. No. 58,049
2 Claims. (Cl. 137—391)

This invention relates to improved valve mechanism which is particularly adapted to control the flow of liquid into and out of the brine tank of a base exchange water treatment apparatus.

In he regeneration process a brine solution is drawn from the brine tank to the unit holding the base exchange material by means of an aspirator, injector or similar suction creating device. The suction device draws brine from the tank at a suitable rate and for a preselected period of time, after which suitable valve mechanism is operated to introduce water under pressure into the brine tank to refill it to a predetermined high level. Thus the brine tank is refilled with fresh water after each regeneration and the cycle of water softening, regeneration, and in some cases backwashing, is repeated as often as required.

Many of today's softeners are automatic, having timers and associated control mechanisms to regenerate during the hours of little or no demand and then return the apparatus to softening operation. This results in maintaining line pressure on the brine valve tending to cause overflowing of the brine tank for periods ranging from many hours to a week or more. During these long periods of water softening operation, even a slow leak in the brine tank refill control valve will and often does cause troublesome overflowing and loss of brine. Such leakage is frequently caused by the lodging of solid particles of salt and sediment from the brine and water on the valve closure member and/or on its seat in sufficient amount to prevent complete leakproof closing of ordinary refill control valves. In installations having a large float or utilizing relatively high fluid pressure to hold a refill control valve of ordinary construction in closed position, sticking of the valve in its closed position frequently occurs, with the result that the valve fails to open when suction in the brine line is relied on to open the valve.

Accordingly, it is a broad object of this invention to provide an improved brine valve adapted to minimize both sticking in closed position and leakage causing overflowing of the brine tank.

A particular object is to provide in a brine tank valve of the type adapted to be submerged in liquid in the brine tank an improved flexible and elastic pressure responsive sealing member which is formed on its sealing face with a plurality of radially spaced concentric circular ridges adapted to coact with a confronting seat of large area to form a plurality of annular closure members, the complete closing of any one of which will prevent leakage.

These and other objects and advantages of the invention will become apparent from the following detailed description taken in connection with the accompanying drawing in which is shown an illustrative embodiment of the invention.

In the drawing:

FIGURE 1 is a vertical sectional view of valve mechanism constructed in accordance with this invention and positioned in a brine tank of the type commonly used in base exchange water treatment apparatus, and FIG. 2 is a cross sectional view taken on the line 2—2 of FIG. 1.

Referring to the drawing and particularly to FIG. 1, our valve mechanism is shown within a brine tank 12 of a conventional water softener of automatic or semi-automatic type. A conduit 10 connects the brine valve to the water softener valve mechanism (not shown) for alternately supply make-up water to the brine tank under super-atmospheric pressure and withdrawing brine under sub-atmospheric pressure. Conduit 10 is connected at its lower end by threads 11 to a boss 15 forming a part of a main valve body A. The boss 15 has a bore 21 which is internally threaded to fit the threads 11 of conduit 10. Communicating with the bore 21 is a passage having a vertical portion 23 and a horizontally extending portion 24 formed in the body A. Seated on the lower end surface of bore 21 is a flow regulating device 32 in the nature of a check valve having a notch 32a in its lower face adapted to restrict flow from conduit 10 to passage 24. The device 32 is drawn upwardly to allow flow at a relatively high rate when sub-atmospheric pressure is created in the conduit 10. A threaded plug 16 closes one end of passage 24.

A chamber 18 is formed at the lower end of a threaded bore 19 in the valve body A. Fitting in the threaded bore 19 is an extension member 45 of valve body A having a flat lower end forming a seat 44 for a valve closure member 47 in the chamber 18. Passage 24 is in communication with chamber 18 at one side and a passage 46 extends upwardly from the chamber 18 to connect this chamber with the interior of the brine tank 12. Valve member 47 is fixed on the lower end of a stem member 48 which is movable axially in the passage 46. As shown in FIG. 2, stem member 48 has four integral, longitudinally extending guide flanges 48a which slidably engage the walls of the passage 46 to allow flow through this passage along the stem and to insure straight line movement of the stem.

Extension member 45 of the valve body A has an enlarged upper section 49 the bottom surface of which abuts against an upper surface 17 of valve body A and a ring 43 is provided to seal the joint between the member 45 and valve body A. Formed in the upper side of extension member 45 is a recess 41 adapted to receive the lower portion of a nut 50 which is fixed on the upper end portion of the stem member 48.

The nut 50 has a threaded connection with a tubular casing B having a relatively wide lower portion 60 and a reduced upper portion 62. Passages 50a are formed in the nut 50 in continuation of the passage 46 for flow to and from the chambered interior of the casing B. A centrally located recess is formed in the upper face 50b of the nut 50 to receive a flexible diaphragm 63. The peripheral portion of this diaphragm 63 is confined between an annular flange 60b on the casing member 60 and the face 50b of nut 50. At its lower side the casing member 60 is formed with a flat annular surface for contact with an annular gasket 61 which is held in place on casing member 60 by an annular flange 50c formed on the nut 50. Flange 50c and the bottom surface of the nut 50 are spaced from the top and peripheral surfaces of extension member 45 defined by the recess 41 to afford an annular passage 40 extending from the passage 46 to the upper surface 42 of the member 45.

Surface 42 constitutes an annular seat for the gasket 61 which is raised and lowered by the float hereinafter described in response to changes in the elevation of the fluid in tank 12. Portion 62 of the casing B is formed with a cylindrical bore and laterally opening ports 64 which are in continuous communication with the interior of the tank 12. The flexible diaphragm 63 has a central opening 66 for flow between the passages 50a and port 64 and a float ball 65 is mounted in the central chamber of the member 62 and adapated to close the opening 66.

A tubular stem member 70 is fixed at its lower end in the casing member 62 and extends axially through a central bore formed in the float 75. This float is fixed on the stem member 70 and is movable in response to changes in the elevation of liquid in the brine tank to actuate valve closure member 47 to and from closed position. Float ball 65 is also movable in response to changes in elevation of the liquid in the brine tank, being confined in the casing member 62 and hollow stem member 70 for movement in vertical alignment with the opening 66 in the diaphragm 63. The upper end of the stem member 70 is closed by a cap 71 formed with a small off-center vent hole 72.

An important feature of our invention is the construction of closure member 47 which insures a leakproof seal and substantially prevents objectionable sticking of this member in contact with its seat. Closure member 47 has a generally circular body of unusually large area exposed to fluid pressure in valve chamber 18. It is constructed largely from flexible resilient material, e.g., suitably soft rubber or rubber-like material of approximately 60 durometer hardness, and is formed on its contact face with a series of concentric circular ridges each of which is adapted to make sealing contact with the lower surface 43 of valve member 45. To this end we provide a plurality of relatively small concentric circular ridges 47a having relatively sharp tops extending to a common level and a peripheral, relatively high circular ridge 47b extending to a higher level and having a relatively flexible thin supporting flange 47e. A relatively thick central portion 47c of the member 47 extends beneath the ridges 47a and is reinforced by a perforated disk 47d which is embedded in the resilient elastic body of the closure member 47 as an insert in the mold for this member. A head 48b is formed on the stem member 48 and fits in a centrally located recess in the closure member 47 to secure the latter to the stem member.

To facilitate adjustment of the quantity of brine which may be drawn from the tank 10 for each regeneration cycle the float 75 may be secured in various selected positions along the hollow stem member 70. To this end a suitably tight frictional fit may be provided between the float and stem member 70 or other suitable or conventional fastening means may be provided.

*Operation*

In operation, during substantially the entire water softening period, brine in the tank 12 is at a high level such as that indicated by the broken line H in FIG. 1. During this time float ball 65 is in its elevated broken line position indicated in FIG. 1, housing B is in its elevated broken line position, gasket 61 is raised from its seat 42 and the main valve closure member 47 is closed against its seat 44. In conventional automatic and semi-automatic softeners water under full line pressure remains in the chamber 18 to securely retain closure member 47 in its closed position. Peripheral ridge 47b is thereby compressed so that its upper surface is on the same level as the tops of the ridges 47a and all of these ridges are held under compression and in full circle contact with spaced concentric areas of the seat 44. Thus leakage and resulting overflowing of the brine tank is prevented under normal operating conditions.

To start regeneration brine is drawn from the tank 12 by establishing sub-atmospheric pressure in the conduit 10. As hereinbefore indicated, this is usually accomplished by means of an aspirator or injector of common type (not shown) which is supplied with water through the automatic controls associated with the water treatment tank. Upon the establishment of subatmospheric pressure in the conduit 10, flow control device 32 is raised to permit flow at an increased rate to this conduit from the tank 12. The resulting negative pressure in the chamber 18 and atmospheric pressure in the brine tank acting on the closure member 47 forces this member downwardly away from its seat. Movement of this member is transmitted by stem member 48, nut 50, casing members 60 and 62 and hollow stem 70 to the float 75. Initially the flow of brine is from the ports 64 through the opening 66 in diaphragm 63 (float ball 65 being in an elevated position) through passages 50a and 46 to the chamber 18, and thence through passages 24, 23 and 21 to the conduit 10. Brine may also enter the passage 46 through the annular passage 40 as long as the gasket 61 is held in an elevated position by the float 75. After a short initial period of brine draw the float 75 and connected members move down to an elevation where the gasket 61 closes at its seat 42 and closure member 47 reaches its fully open position. Brine continues to be drawn out through ports 64, through the opening 66 and passages 50a and 46 to chamber 18 and thence to and through conduit 10 until the float ball 65 reaches its lower level position and closes opening 66, as indicated in full lines in FIG. 1. At this time the brine is approximately at a low level L and further flow of brine to the conduit 10 is cut off at diaphragm 63 as well as at gasket 61. Float ball 65 in closing opening 66 in diaphragm 63 prevents the entry of air into conduit 10 as the brine reaches its low level in the tank 12.

The next step of operation is to refill the brine tank to a predetermined high level by supplying fresh water at the available line pressure through the conduit 10. As the refill flow starts it may be assumed that the brine is at its low level L. Water now enters the brine tank at the predetermined reduced rate permitted by the notch 32a in flow control device 32 and flows through the passages 23, 24 to chamber 18, thence through the passages 46, 50a and opening 66 to unseat the float ball 65 and allow flow into the brine tank through the ports 64. As this flow continues the ball 65 rises in tubular stem member 70 and the float 75 and connected members including closure member 47 remain in the full line position shown until the level of brine approaches its high level. The buoyance of float 75 then causes closure member 47 to move upwardly and finally to close at its seat 44. As the member 47 approaches its closed position its peripheral ridge 47b first makes contact with the seat 44, stopping flow to passage 46 and allowing pressure to build up in the chamber 18. Flange 47b is thereby compressed and forced down, allowing ridges 47a to make contact with the seat 44 and to be held in sealing contact therewith by fluid pressure in the chamber 18 acting on the wide circular member 47. This has been found to be effective in eliminating leakage even when there are substantial deposits of sediment and salt particles on the contacting faces of the member 47 and its seat 44.

Notwithstanding the utilization of full line pressure to hold the closure disk 47 in its closed position there is no tendency for this member to stick or be retained in its closed position when sub-atmospheric pressure is created in the chamber 18. This freedom from sticking is due to the combined effect of the narrow, concentric ridge contacts with the flat valve seat and the fact that no part of this resilient elastic closure member can be extruded or forced into a flow passage at its down stream side under the pressure exerted on this member to retain it in closed position.

It will be evident that our improved valve, when in use, is substantially entirely submerged in the brine in a tank of the open top type.

This application is a division of our application for patent for Brine Tank Valve, Serial No. 757,470, filed August 27, 1958, now Patent No. 2,985,423.

We claim:

1. A liquid level control valve adapted to be submerged in liquid comprising, a valve body having an internal chamber, a normally submerged first port, a second port communicating with said chamber, a passage extending upwardly from said chamber for flow to and from said first port, a first valve seat surrounding the lower end of said passage, a second valve seat surrounding the upper end of said passage, a valve stem member extending from said chamber upwardly and coaxially through said passage, a valve closure member movable in said chamber to and from said first seat and secured to the lower end of said stem member, a chambered casing connected to the upper end portion of said stem member, a sealing gasket secured to the lower end of said casing for contact with said second valve seat, said casing having a chamber communicating with the upper end of said passage and first port, a flexible diaphragm extending across said casing chamber between said passage and port, said diaphragm having a central opening for flow of liquid between said first passage and first port, a hollow stem member secured to and projecting upwardly from said casing, a float secured to said hollow stem member, and a float ball adapted to close the opening in said diaphragm, said ball being confined in said casing chamber and hollow stem member and being movable with changes in liquid level from a position closing said opening when the submerging liquid reaches a predetermined low level to an open position when the liquid level rises.

2. A liquid level control valve adapted to be submerged in liquid comprising, a valve body having an internal chamber, a normally submerged first port, a second port communicating with said chamber, a passage extending upwardly from said chamber for flow to and from said first port, a first valve seat surrounding the lower end of said passage, a second valve seat surrounding the upper end of said passage, a valve stem member extending from said chamber upwardly and coaxially through said passage, a valve closure member movable in said chamber to and from said first seat and secured to the lower end of said stem member, a threaded nut secured to the upper end portion of said stem member coaxially therewith, a chambered casing having a threaded connection with said nut and projecting upwardly therefrom, a sealing gasket secured to the lower side of said casing for contact with said second valve seat, said casing having a chamber communicating with the upper end of said passage and a third port, a flexible diaphragm extending across said casing chamber between said passage and port, said diaphragm having a central opening for flow of liquid between said passage and third port, and being confined between an upper surface of said nut and a surface of said casing, a hollow stem member secured to and projecting upwardly from said casing, a float secured to said hollow stem member, and a float ball adapted to close the opening in said diaphragm, said ball being confined in said casing chamber and hollow stem member and being movable therein in response to changes in liquid level from a position closing said opening in the diaphragm when the submerging liquid reaches a predetermined low level to open positions when the liquid level rises.

References Cited in the file of this patent

UNITED STATES PATENTS

| 2,716,422 | Whitlock | Aug. 30, 1955 |
| 2,906,285 | Rosten et al. | Sept. 29, 1959 |
| 2,935,081 | Kryzer | May 3, 1960 |